United States Patent
Taylor et al.

(10) Patent No.: US 10,701,120 B2
(45) Date of Patent: Jun. 30, 2020

(54) PROXIMITY BASED ENTITLEMENT SHARING

(71) Applicant: Disney Enterprises, Inc., Burbank, CA (US)

(72) Inventors: Christopher S. Taylor, Burbank, CA (US); Mark Arana, West Hills, CA (US); Josiah Eatedali, Los Angeles, CA (US); Edward Drake, Stevenson Ranch, CA (US); Ann Lee, Burbank, CA (US); Anthony Mutalipassi, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 174 days.

(21) Appl. No.: 14/745,357

(22) Filed: Jun. 19, 2015

(65) Prior Publication Data
US 2016/0261658 A1 Sep. 8, 2016

Related U.S. Application Data

(60) Provisional application No. 62/129,217, filed on Mar. 6, 2015.

(51) Int. Cl.
*H04L 29/06* (2006.01)
*H04W 4/08* (2009.01)
(Continued)

(52) U.S. Cl.
CPC ...... *H04L 65/4076* (2013.01); *H04L 65/4084* (2013.01); *H04W 4/08* (2013.01);
(Continued)

(58) Field of Classification Search
CPC ..... H04W 4/008; H04W 4/206; H04W 84/18; H04W 64/00; H04W 8/005; H04L 67/18;
(Continued)

(56) References Cited

U.S. PATENT DOCUMENTS 7,792,756 B2 9/2010 Plastina et al.
7,881,656 B2 2/2011 Khedouri et al.
(Continued)

OTHER PUBLICATIONS

Hakansson et al., Facilitating Mobile Music Sharing and Social Interaction with Push!Music, http://www.mobile-life.org/sites/default/files/HICSS_2007_568_hakansson.pdf, accessed on Jan. 29, 2016, pp. 1-10.
(Continued)

*Primary Examiner* — Djenane M Bayard
(74) *Attorney, Agent, or Firm* — Farjami & Farjami LLP

(57) ABSTRACT

Systems and methods for sharing protected media content are provided. Protected media content can be shared when at least a first and second user are proximately located. The first and second user can be bound or paired based on one or more identification indicia associated with first and second user devices utilized, owned, or operated by the first and second users, respectively. Upon pairing, media content from the first and second users' media content libraries can be shared. Additionally, proximate location can be leveraged to surface media content to other users, giving such other users the opportunity to discover new media content, and otherwise engage in transactions involving the new media content. Further still, the most popular media content associated with the second user or group of users proximate to the first user can be determined and used to prompt further interaction or display information regarding such popular media content.

25 Claims, 7 Drawing Sheets

(51) Int. Cl.
*H04W 76/14* (2018.01)
*H04W 4/80* (2018.01)
*H04W 8/00* (2009.01)
*H04W 84/18* (2009.01)

(52) U.S. Cl.
CPC .............. *H04W 4/80* (2018.02); *H04W 8/005* (2013.01); *H04W 76/14* (2018.02); *H04W 84/18* (2013.01)

(58) Field of Classification Search
CPC ....... H04L 51/32; H04L 65/40; H04L 65/403; H04L 63/0861; H04L 67/06; H04L 67/10; H04L 63/08; H04L 65/1093; H04L 63/0492; H04L 63/20; H04L 2463/102; H04L 2209/805; H04L 63/083; H04L 67/26; H04L 67/306; H04L 67/38; H04L 51/10; H04L 63/0428; H04L 63/0435; H04L 63/102; H04L 63/107; H04L 65/1069; H04L 67/2842; H04L 67/2847; H04L 67/2885; H04L 67/02; H04L 61/1511; H04L 65/4084; H04L 67/1097; H04L 67/2852; H04L 67/36; H04L 67/1051; H04L 65/4076; H04L 67/1095; H04L 63/105; H04L 67/12; H04L 67/28; H04L 9/0819; H04L 9/0822; H04L 9/0841; H04L 9/3231; H04L 9/3247; H04L 9/3297; H04L 12/1813; H04L 12/2803; H04L 12/6418; H04L 43/12; H04L 51/20; H04L 5/0032; H04L 5/0037; H04L 5/0046; H04L 63/061; H04L 25/0202; H04L 29/08657; H04L 41/026; H04L 41/22; H04L 43/065; H04L 43/0811; H04L 51/043; H04L 5/0069; H04L 61/6022; H04L 61/605; H04L 63/04; H04L 63/0442; H04L 63/205; H04L 65/1006; H04L 65/1073; H04L 65/607; G06F 3/011; G06F 3/017; G06F 3/044; G06F 1/163; G06F 3/03547; G06F 3/038; G06F 3/041; G06F 17/30029; G06F 17/30823; G06F 3/165; G06F 17/30041

See application file for complete search history.

(56) References Cited

U.S. PATENT DOCUMENTS

| | | | |
|---|---|---|---|
| 8,145,532 B2 | 3/2012 | Jones et al. | |
| 8,346,867 B2 | 1/2013 | Sharkey | |
| 8,677,502 B2 | 3/2014 | Hanson et al. | |
| 8,782,136 B1* | 7/2014 | Ho | G06F 9/468 709/204 |
| 8,881,204 B2 | 11/2014 | Ojala et al. | |
| 9,268,920 B1* | 2/2016 | Butler | G06F 21/10 |
| 9,378,386 B1* | 6/2016 | Saylor | G06F 21/6245 |
| 2005/0286546 A1 | 12/2005 | Bassoli et al. | |
| 2009/0282130 A1* | 11/2009 | Antoniou | H04L 41/0886 709/220 |
| 2012/0190386 A1 | 7/2012 | Anderson | |
| 2013/0002489 A1* | 1/2013 | Erad | G01S 3/20 342/432 |
| 2013/0174223 A1* | 7/2013 | Dykeman | G06F 21/10 726/4 |
| 2013/0174273 A1* | 7/2013 | Grab | G06F 21/10 726/28 |
| 2013/0204961 A1* | 8/2013 | Fliam | H04L 67/2885 709/214 |
| 2013/0225081 A1* | 8/2013 | Doss | H04W 4/206 455/41.2 |
| 2014/0164547 A1* | 6/2014 | Fullagar | H04L 65/4084 709/213 |
| 2015/0100991 A1 | 4/2015 | Risberg et al. | |
| 2015/0147968 A1* | 5/2015 | Friedman | G06F 3/017 455/41.2 |
| 2015/0161360 A1 | 6/2015 | Paruchuri et al. | |
| 2016/0006823 A1* | 1/2016 | Strong | G06Q 10/10 709/206 |
| 2016/0044090 A1* | 2/2016 | Glickfield | H04L 67/10 709/204 |
| 2016/0119438 A1* | 4/2016 | Abramson | H04N 21/41407 709/217 |
| 2016/0162252 A1* | 6/2016 | Di Censo | G11B 27/11 700/94 |
| 2016/0219098 A1* | 7/2016 | Baca | G06Q 50/30 |
| 2017/0019495 A1* | 1/2017 | Bennis | H04L 67/2842 |

OTHER PUBLICATIONS

Mutakha, Jarvis, Co-located Mobile Media Experiences Through Localized Cloud, http://people.cs.uct.ac.za/~gsaul/mhlzol004/cloudlet/download/report_0.pdf, accessed on Jan. 29, 2016, pp. 1-81.

* cited by examiner

```
┌─────────────────────────────────────────────┐
│  DETERMINING WHETHER A FIRST USER IS PROXIMATE TO A │
│                  SECOND USER                │
│                     400                     │
└─────────────────────────────────────────────┘
                      │
                      ▼
┌─────────────────────────────────────────────┐
│  UPON A DETERMINATION THAT THE FIRST USER AND THE │
│  SECOND USER ARE PROXIMATE TO EACH OTHER, PAIRING │
│       THE FIRST USER AND THE SECOND USER    │
│                     402                     │
└─────────────────────────────────────────────┘
                      │
                      ▼
┌─────────────────────────────────────────────┐
│     ALLOWING AT LEAST ONE OF THE FIRST AND SECOND │
│  USER TO ACCESS ONE OR MORE MEDIA CONTENTS FROM │
│  A MEDIA CONTENT LIBRARY ASSOCIATED WITH THE OTHER │
│          OF THE FIRST AND SECOND USERS      │
│                     404                     │
└─────────────────────────────────────────────┘
```

FIG. 4

```
┌─────────────────────────────────────────────────────┐
│   DETERMINING THE MOST POPULAR MEDIA CONTENT        │
│   ASSOCIATED WITH A SECOND USER OR GROUP OF USERS   │
│        THAT IS WITHIN A PROXIMITY TO A FIRST USER   │
│                         500                         │
└─────────────────────────────────────────────────────┘
                            │
                            ▼
┌─────────────────────────────────────────────────────┐
│  PROVIDING AT LEAST ONE OF INFORMATION REGARDING    │
│   THE MOST POPULAR MEDIA CONTENT OF THE SECOND      │
│   USER OR GROUP OF USERS AND A TRANSACTION          │
│  OPPORTUNITY REGARDING THE MOST POPULAR MEDIA       │
│   CONTENT OF THE SECOND USER OR GROUP OF USERS      │
│                         502                         │
└─────────────────────────────────────────────────────┘
```

FIG. 5

PROXIMITY BASED ENTITLEMENT SHARING

CROSS-REFERENCE TO RELATED APPLICATIONS

This application claims the benefit of U.S. Provisional Patent Application No. 62/129,217 filed on Mar. 6, 2015, which is incorporated herein by reference in its entirety.

TECHNICAL FIELD

The present disclosure relates generally to accessing protected media content.

DESCRIPTION OF THE RELATED ART

Broadcasting can refer to the distribution of media content (e.g., audio, video, etc.) to a dispersed audience via some mass communications medium. The mass communications medium may be a cable network, a data network, radio waves, and the like. Digital distribution can refer to the delivery of media content without the use of physical media. Digital distribution has become popular due to advances in computer networking and communication technologies.

BRIEF SUMMARY OF THE DISCLOSURE

In accordance with a first embodiment, a computer-implemented method, comprises determining whether a first user is proximate to a second user. The method further comprises allowing at least one of the first and second user to access one or more media contents from a media content library associated with the other of the first and second users.

In accordance with a second embodiment, a system comprises a first user device, a second user device, and a content provider. The content provider provides to a second user identified via the second user device, access to one or more protected media contents from a first media content library associated with a first user identified via the first user device upon a determination that the first and second users are proximate to each other.

In accordance with a third embodiment, a system, comprises a first user device and a second user device. Furthermore, the system comprises a first content provider providing a first set of one or more protected media contents to a first user associated with the first user device, and a second content provider providing a second set of one or more protected media contents to a second user associated with the second user device. Further still, the system comprises a server adapted to allow temporary access by the second user to the first set of the one or more protected media contents and allow temporary access by the first user to the second set of the one or more protected media contents upon a determination that the first and second user devices are proximate to each other.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is an operational flow diagram illustrating an example process for proximity based entitlement sharing in accordance with various embodiments.

FIG. 5 is an operational flow diagram illustrating an example process for determining media content popularity in accordance with various embodiments.

Figure 1:
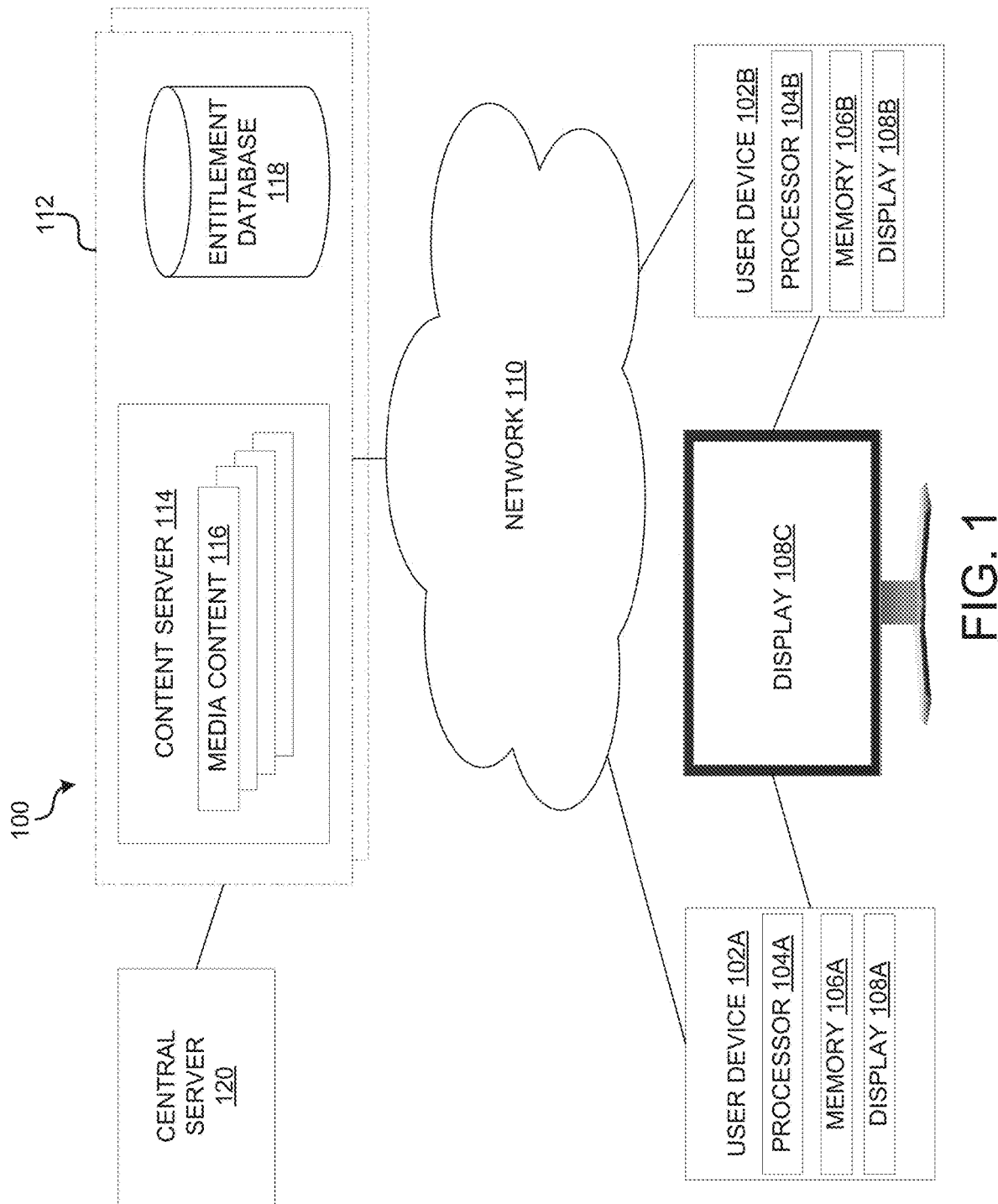
FIG. 1 illustrates an example environment in which various embodiments may be implemented.

The figures are not exhaustive and do not limit the present disclosure to the precise form disclosed.

DETAILED DESCRIPTION

In traditional broadcasting, such as television broadcasting or radio broadcasting, the audience has no control over what is being broadcast or when "linear" content can be consumed. Accordingly, a television program must be watched at a scheduled time and on a channel set by the television program provider. "Non-linear" content, on the other hand, can refer to particular media content that can be selected by a consumer for viewing at a time of their choice.

As previously discussed, digital distribution has become popular due to advances in computer networking and communication technologies. One example of digital distribution involves a server downloading or streaming non-linear media content to a user device over a data network, such as the Internet. Streaming media access or downloadable media content can be provided by traditional broadcasting entities, third-party media content providers, studios that create and/or produce media content, etc. In some instances, a user may pay a monthly fee for a subscription to a media content service provided by a media content provider. The subscriber may then access media content in the media content provider's media content library to download or stream to a user device. For example, the subscriber can utilize a client media player, media presentation application, web browser, etc. that can connect to and access desired media content from, e.g., a server hosted by the media content provider.

Alternatively, a consumer may rent media content by paying a fee to access the desired media content from a media content provider for some predetermined amount of time. Additionally still, a consumer may purchase the media content outright for a fee. The consumer may then have access to the purchased media content for an indefinite amount of time via a media content service, or may "unlock" downloaded media content for consumption via a consumer's own media presentation device, application, etc. To that end, a subscriber may have the ability to create or generate his/her own library of media content. It should be noted that media content in accordance with various embodiments may include, but is not limited to digital music, movies, TV shows, pictures, eBooks, audio books, video games, etc. Although various embodiments disclosed herein are directed to media content that is provided by some content provider such as a broadcasting entity, media content can also be provided by users, e.g., digital photographs taken by users themselves.

In order to ensure that media content is accessible only to subscribers, paying consumers, or in the case of, e.g., personal photographs, other users or entities to which the photograph-taking user wishes to provide access, media content may be protected by some form of digital rights management (DRM) or entitlement mechanism. For example, an entitlement corresponding to media content can be issued (in accordance with one or more relevant entitlement records) to allow a subscriber, consumer, or other user access to streaming or downloaded media content.

However, conventional systems and methods of digitally distributing protected media content are premised upon a single user, subscriber, or entity having access to the protected media content. That is, only the user that is issued the proper entitlement may view or consume that protected media content. Although such restrictions are desirable in certain contexts, it may be desirable to "relax" these restrictions in other scenarios. For example, the ability to demonstrate a consumer's taste in media or provide media-based entertainment to others through the use of a DVD or Blu-ray disc library may be lost in the context of digitally distributed media content. Sharing of digitally distributed media content can be achieved by revealing a user's account information and/or password to another user, linking a second user's account subsequent to a first user providing one or more types of identifying information or data, etc. However, the exchange of such sensitive information may be undesirable and subject to abuse. To this end, various embodiments described herein provide systems and methods for proximity based entitlement sharing between two or more users. Accordingly, when two (or more) users are proximate to each other, the users may be associated, "bound" or paired together such that one or both users may be granted temporary access to the other user's protected digital media content.

FIG. 1 is a diagram illustrating an example environment in which various embodiments can be implemented. FIG. 1 illustrates a system 100 for obtaining and consuming media content via proximity based entitlement sharing in accordance with various embodiments. As illustrated in FIG. 1, system 100 can include a first user device 102A. First user device 102A may include a processor 104A, a memory unit 106A, a display 108A, and can be configured to store downloaded digital media content, stream digital media content, etc. for presentation on display 108A or a separate or stand-alone display, e.g., display 108C. First user device 102A may be a DVR, a cable/satellite/internet protocol television (IPTV) set-top box, a gaming console, a tablet personal computer (PC), a smart phone, a laptop PC, etc. Display 108C may be a TV, monitor, or other presentation/media content consumption apparatus.

System 100 can also include a second user device 102B. Like first user device 102A, second user device 102B may include a processor 104B, a memory unit 106B, a display 108B, and can be configured to store downloaded digital media content, stream digital media content, etc. for presentation on display 108B or a separate display, e.g., display 108C. Second user device 102B may be a digital video recorder (DVR), a cable/satellite/internet protocol television (IPTV) set-top box, a gaming console, a tablet personal computer (PC), a smart phone, a laptop PC, etc.

As will be described in greater detail below, in some embodiments, one or more of user devices 102A or 102B may be a wearable identification device, such as a watch, an ID band, etc. In some embodiments, the user devices 102A or 102B may belong to a user, i.e., the user's personal device, or may be provided by some other entity, such as a media content provider. It should be noted that first and second user devices 102A and 102B need not be the same type of device. That is, and in accordance with one example scenario, first user device 102A may be a smartphone, and second user device 102B may be a wearable identification device.

System 100 may further include one or more media content providers 112, which may be a broadcast entity, such as a television broadcast network entity (e.g., ABC), a cable provider (e.g., COMCAST®), or any other digital media content distributor, such as Amazon®, iTunes®, Netflix® or other third-party distributor of media content. Content provider 112 may include a content server 114 on which digital media content 116 can be stored, along with any required entitlements, other entitlement information, DRM licenses, etc. which can be maintained in entitlement database 118.

As described previously, some embodiments contemplate providing proximity based entitlement sharing in a provider-agnostic manner. That is, user devices 102A and 102B may be used for or associated with different media content providers or services. Therefore, system 100, in accordance with some embodiments, may further include a central server 120 that can act as a unifying entity that can bind or associate users across providers, networks, etc., such as multiple media content providers. That is, central server 120 can provide proximity based entitlement sharing between, e.g., two or more distinct content providers. For example, users need not subscribe to the same media content provider service in order to engage in proximity based entitlement sharing in accordance with various embodiments.

It should be noted that one or more licenses or temporary licenses can be created, utilized, and/or transferred to the appropriate entities in accordance with various embodiments. Such licenses can be configured to account for varying levels of access and/or distribution, time limits, usage limits, and can be partitioned if need be. For example, in accordance with one of the aforementioned scenarios, media content provider 112 may provide a temporary license to an instance of media content. In this way, a viewer is allowed to rent the media content for viewing, as previously alluded to.

Network 110 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc. Further still, network 110 may be one or more combinations of any of the aforementioned networks.

It should be noted that proximity based entitlement sharing differs from conventional sharing technologies that merely allow unprotected content to be shared if multiple users are logged into or reside on, e.g., the same network. Still other existing technologies may tie entitlement to a particular physical medium, such as a flash drive on which media content is encoded. The authorization needed to unlock the encoded media content may be "portable" in the sense that the flash drive may be connected to a display device, and the display device may provide connectivity to an authorization server in order to allow authorization to be obtained. Nevertheless, the media content can still only be consumed via the flash drive.

Rather, users that share media content via proximity based entitlement sharing are able to share media content that is protected by some form(s) of authorization requirement(s), e.g., DRM, license restrictions, or some other form of entitlement requirement(s). Moreover, media content that is shared via proximity based entitlement sharing need not be bound by infrastructure/networks, publishers/service providers, distribution channels, physical media/devices, etc. that in some way inhibit content sharing using traditional techniques and/or mechanisms.

For example, two users may be subscribers to the same media content service, where media content can be accessed via a media content service application. Based upon the proximity of the two users or their location relative to each other, the two users can be bound with respect to each of their media content libraries based upon the users' respective media content service application IDs. As a result, the media content service application running on one device of a first user recognizes a second user proximately located to the first user and vice versa. The media content service application may then allow each user in 2-way sharing (or only one user in 1-way sharing) to access and consume media content belonging to, rented by, or otherwise associated with the other user. If the first and second users separate, e.g., the first user leaves the second user's location, consumption of the second user's media content can be stopped, an alternative ad-supported version of the second user's media content can be presented to the first user, or some other change in content access or sharing may occur.

In one embodiment, in order to share media content, neither the first nor the second user is required to exchange or divulge any account or other identifying information with each other. The first and second users in some embodiments may have no existing relationship or knowledge of one or the other user's account prior to sharing their respective libraries of media content with each other. It is by virtue of their proximity to each other that triggers media content sharing in accordance with the technology disclosed herein. That is, a user's presence is effectively acting as the authorization.

In some embodiments, a super-distribution system may exist where users may have access to or may have downloaded one or more instances of media content. However, consumption of the media content is predicated upon proximity to another user that has the authorization, e.g., entitlement, token, key, etc. for that particular instance of media content. Additionally still, media content need not be tied or bound to a particular medium, and access need not be limited to or through a particular network, infrastructure, service, publisher, provider, etc. In this way, temporary access can be granted to users without traditional authorization to consume media content. Moreover, users' entire libraries can be made portable and shareable in an anonymous manner, and the users' libraries need not be maintained or obtained through the same service or provider.

Further to the above, it should be noted that one or more usage rules and/or constraints can be associated with the proximity based entitlement sharing of media content. As described above, proximity based entitlement sharing can provide temporary authorization, such that once the requisite proximity to an "originally-authorized" user is lost, consumption of the media content may be stopped or otherwise limited. For example, consumption of the media content may continue for a certain period of time subsequent to the requisite proximity being lost. In another example, if an instance of media content is currently being consumed, and the requisite proximity is lost, that instance may be locked so that other users cannot consume the media content. Still other usage rules or constraints can be configured to determine what content can be consumed, how the content can be consumed, and/or who can consume the content.

If multiple users are authorized to consume some particular media content, authorizations may be aggregated such that a desired number of entitlements can be made available if so desired. As discussed above, proximity based entitlement sharing can result in users that have no pre-existing relationship having temporary access to each other's content. However, limitations can be placed on the access of content if desired. Such limitations can be user-determined, producer or provider-determined, etc.

Referring back to FIG. 1, in operation, system 100 may effectuate proximity based entitlement sharing as follows. First user device 102A may be associated with a first user, where the first user has a subscription or account with a media content service through which media content can be provided by content provider 112. The first user may have purchased, rented, or subscribed to one or more media content. Thus, the first user may have a first media content library comprising that purchased, rented, or subscribed media content. Second user device 102B may be associated with a second user, where the second user may have a subscription or account with the same media content service. The second user may have his/her own library of media content that the second user has subscribed to, purchased, or rented from content provider 112.

Upon the first user and the second user coming into close proximity with each other, the first and second users may be bound or paired. For example, both the first and second users may be logged into their respective media content service accounts. Upon coming into close proximity to each other, the first and second user devices 102A and 102B may exchange the first and second user's respective media content service IDs, where the respective IDs are associated with media content service applications running on the first and second user devices 102A and 102B. This can occur, for example, if the first user visits the second user's home, and the first user device 102A may receive a message or indication broadcast by the second user device 102B containing the second user's media service application user ID. It should be understood that the first user device 102A may be engaged in a commensurate scanning operation to receive the broadcast message or indication. This can be achieved using some form of discovery protocol or schema.

It should also be understood that although various embodiments are described in the context of a media content service ID exchange or discovery, pairing can be accomplished based on, but not limited to the following: recognizing the first and/or second user's known Internet Protocol (IP) address(es) associated with his/her device; a recognition that at least some media content within the first and second user's media content library overlaps; and an application ID identifying the instance of the media content service application that is running on the users' devices. Moreover, the exchange of the first and second user's respective media content service IDs can occur at the media content provider 112 and/or central server 120. That is, user device 102A and user device 102B do not have to be involved in this exchange, and the exchange can be performed without a priori knowledge of accounts, identities, etc., on the part of the first and second users.

Ultimately, the first and second users may be bound with regard to their respective media content libraries. That is, the first user may access and consume one or more instances of media content in the second user's media content library and vice versa.

It should be noted that such access can vary in accordance with a user's preference(s). That is, the first user may configure his/her media content library to be accessible to other users pursuant to a successful binding, whereas the second user may not. In this case, the second user may access the first user's media content library, but the first user may not necessarily have access to the second user's media content library. Further still, either the first or second user may not wish to engage in proximity based entitlement sharing in which case, even though the first and second users may be determined to be proximate to each other, sharing may be denied or prevented or limited to one of the first or second user accessing the other's media content library.

It should be noted that the degree of proximity required for binding the first and second users may also vary. The requisite proximity may be achieved, as alluded to above, by virtue of the first user visiting the second user's home and the first and second user devices 102A and 102B recognizing the first and second user's respective media service application IDs. Hence, a proximity determination may be based on some general geographic location or range. For example, first user device 102A may be the first user's smartphone, while device 102B may be the second user's set-top box, home PC, network-connected media system, etc. In other embodiments, as will be described in greater detail below, the requisite proximity may be based upon a more restrictive or less restrictive degree of proximity. For example, in one embodiment, where the first and second user devices 102A and 102B are both smartphones, the requisite proximity may be achieved upon the first and second user devices 102A and 102B touching (e.g., by virtue of the user devices' respective near field communication (NFC) functionality, such as via Bluetooth® or WiFi). The proximity may be limited by a communication technology such as Wi-Fi or Bluetooth, or set by a system operator to be 20 feet for example.

In accordance with some embodiments, the requisite proximity may be based upon solely temporal and geographic proximity rather than any signal exchange as in NFC communications. For example, sensors resident within each of the first and second user devices 102A and 102B may simply report their respective locations back to the central server 120. Content provider 112 may then recognize that first and second user devices 102A and 102B are co-located at the same point in time, and initiate proximity based entitlement sharing. Still other ways that proximity based entitlement sharing can be initiated may include, e.g., bio-sensing.

The aforementioned binding or pairing can occur over network 110, which provides connectivity between content provider 112 and the first and second user devices 102A and 102B, respectively. For example, content provider 112 may become aware that two users of its media service application are in close proximity to each other, and the content provider 112 can allow the first and second user's media content libraries to be bound, and therefore accessible by one another. Entitlement information may then be shared by or between first and second user devices 102A and 102B. That is, entitlements normally associated with first user device 102A may also be provided to second user device 102B and vice versa.

In one embodiment, pointers associated with instances of media content may be temporarily updated to point to another user(s) profile(s) upon those users being paired. Consider, for example, a scenario where first and second user devices 102A and 102B are paired as previously described. Upon pairing, the first user of first user device 102A may attempt to access a particular instance of media content normally only accessible by the second user. However, due to the pairing, entitlement database 118 may discover that the appropriate entitlement record associated with the particular instance of media content is linked with a pointer that points to the user profile or account associated with the first user. Accordingly, entitlement database 118 can provide the user profile or account associated with the first user with the requisite entitlement record or license to access the desired media content normally associated with the second user.

Once the first and second users are no longer proximate to one another, access to the second user's media content library by the first user and/or access to the first user's media content library by the second user can be denied. That is, the shared entitlement may cease to exist, and the requisite entitlements provided via entitlement database 118, for example, may no longer be provided to the users. This can result in immediately halting the playback or consumption of the media content. Alternatively, the user with whom media content was being shared may finish consumption of that particular media content, or the media content (which is, e.g., being streamed) may be substituted with an ad-supported version of the media content rather than an ad-free version. In such an instance, embedded timecodes within different versions of media content can be accessed and synchronized to allow an ad-free version to continue playing from a point in time where the pairing is no longer valid or lost or to limit the ability of a user to replay or restart shared media content. In accordance with another embodiment, at the conclusion of a "paired session," the user consuming the shared media content may be presented with one or more options for purchasing or renting his/her own instance of the shared media content, related media content, etc. Still other constraints can be placed on the temporarily linked media content, such as limiting the number of shares, limiting the number of views, instituting a minimum geographical proximity, or other limitation or constraint.

It should be further noted that in accordance with some embodiments, the aforementioned proximity determination may occur once, and thereafter, paired users may access each other's media content/media content libraries until the requisite proximity is lost. In accordance with other embodiments, proximity based entitlement sharing can be provided for some predetermined time limit (either a default or variable time period set by media content provider 100, a time period set by the user whose media content library is being shared, etc.). Moreover, proximity can be periodically or aperiodically checked or verified depending on how strictly content provider 112 or a user (e.g., a first or second user) wishes to control media content access. Further still, the sharing of media content can begin immediately upon user ID discovery, upon a first playback of media content, etc.

Additionally, the binding or pairing described herein can occur on varying levels. For example, and in accordance with one embodiment, users' media content libraries can be paired, whereas in accordance with another embodiment, pairing can occur on a user profile or account level. In accordance with still another embodiment, pairing can occur on a device level.

Moreover, although various embodiments describe the binding or pairing of two user devices, profiles, media content libraries, etc., more than two user devices, profiles, media content libraries, etc., can be bound or paired.

Further still, pairing can result in entitlements being provided on a group basis. That is, certain conditions for unlocking media content can be achieved by virtue of two or more users sharing their respective media content, i.e., the conditions can only be met on a group basis rather than on an individual basis. For example, a first user may have access to a movie, and a second user may have access to that movie's first sequel. Upon engaging in proximity based entitlement sharing, a service provider may choose to provide both the first and second users with access to a movie's second sequel (which was not available to either the first or second user on their own).

Figure 2:
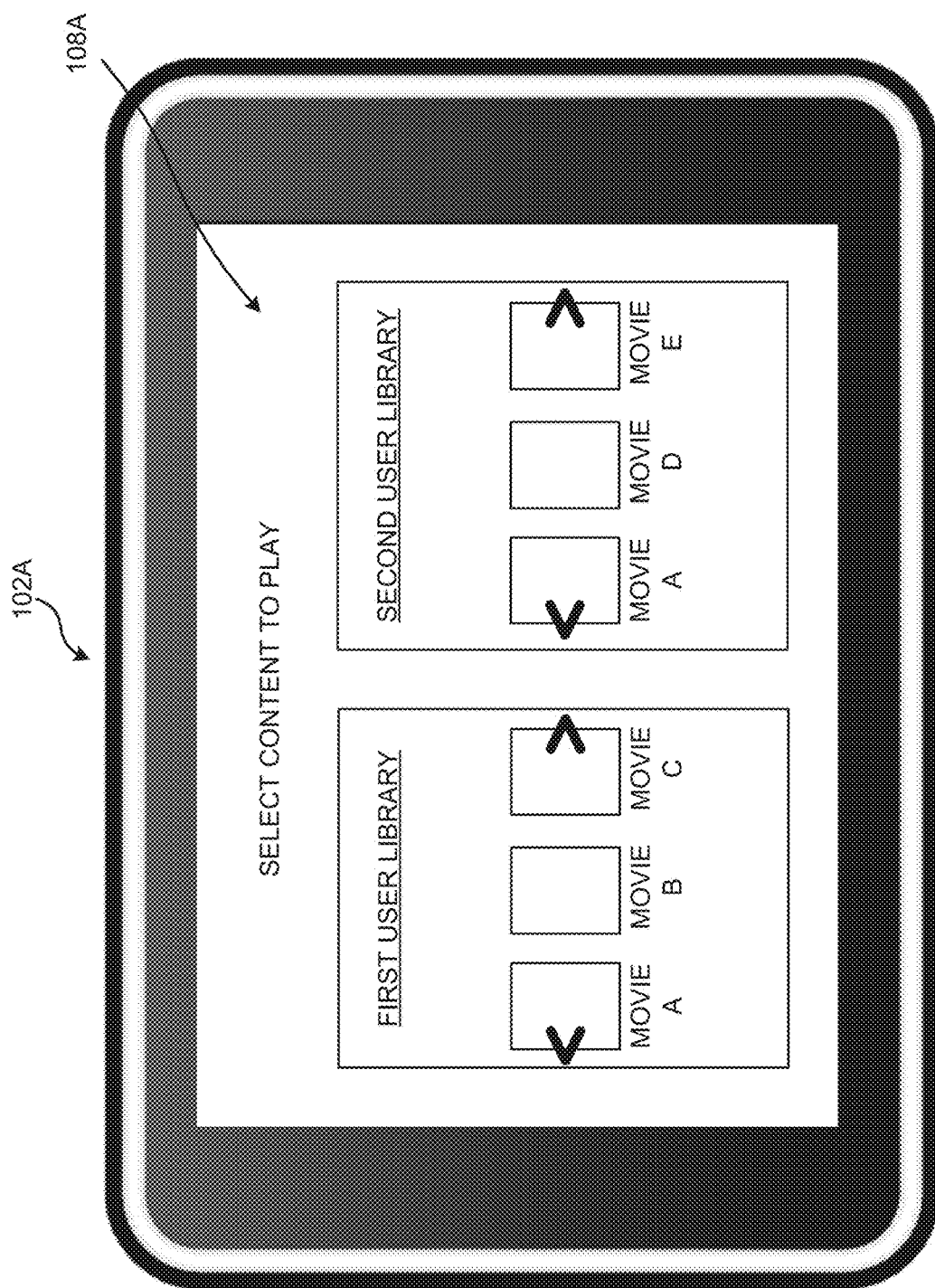
FIG. 2 illustrates an example graphical user interface (GUI) used for selecting media content displayed in based upon proximity based entitlement sharing in accordance with various embodiments.

FIG. 2 illustrates an example graphical user interface (GUI) that may be utilized in the context of proximity based entitlement sharing in accordance with various embodiments. FIG. 2 illustrates first user device 102A, which in this example may be a tablet PC. Display 108A may present a menu to the first user utilizing first user device 102A that includes both the media content library of the first user and that of the second user upon, e.g., pairing of their respective media content libraries. The first user may then select media content from his/her own media content library or from the second user's media content library. As an added benefit, proximity based entitlement can enable content and/or service discovery.

As previously described, pairing user accounts, media content libraries, etc., can be achieved by a discovery protocol in which a first user device broadcasts its IP address, a media content service application ID, etc. In accordance with other embodiments, pairing can be achieved by other types or forms of NFC functionality resident on users' devices. Still other embodiments may utilize geo-fencing, geo-location, or other location-based services in order to determine users' proximity to each other to achieve proximity based entitlement sharing.

Figure 3:
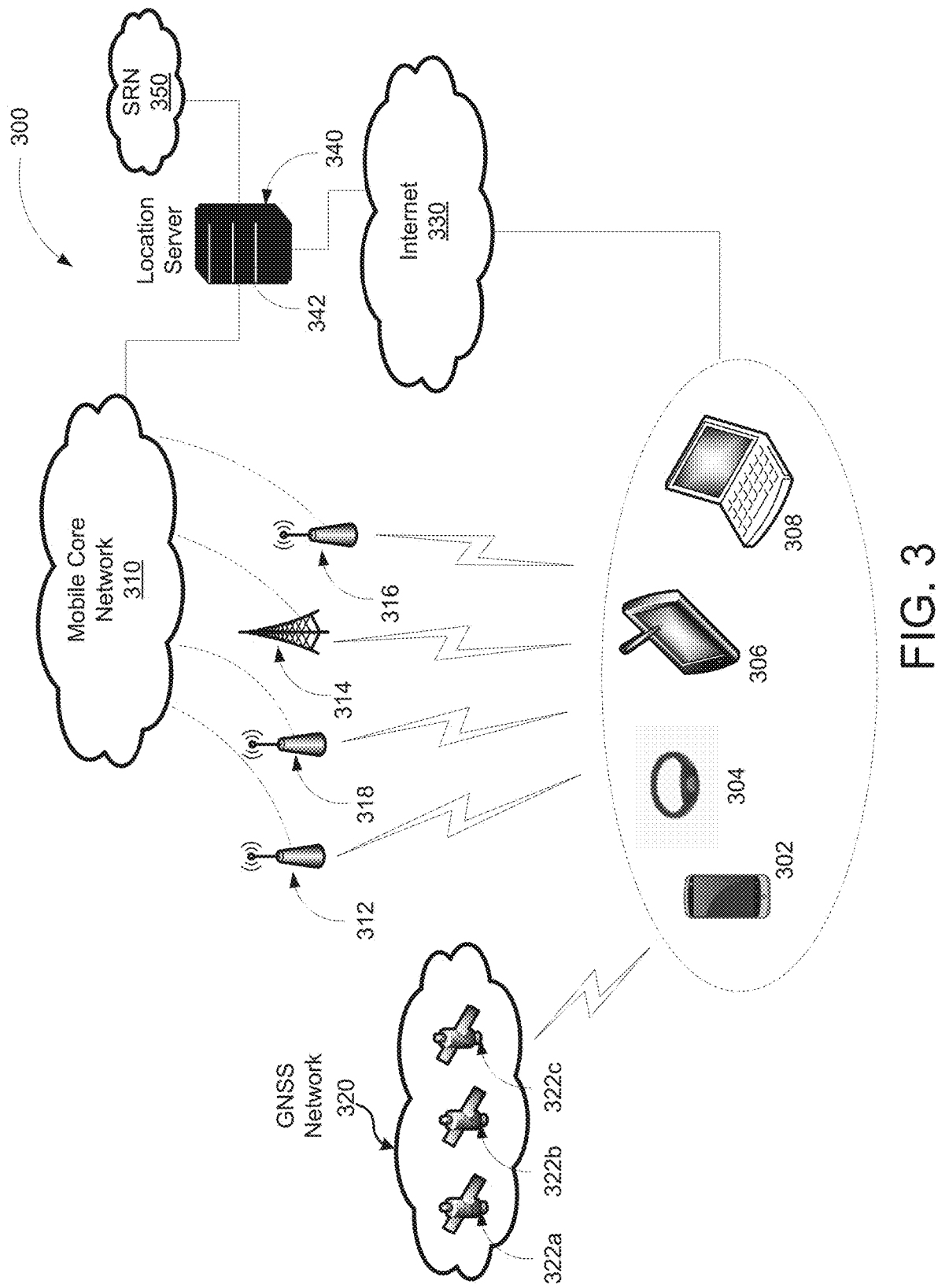
FIG. 3 illustrates an example communications system with which various embodiments may be implemented.

FIG. 3 is a block diagram illustrating an example communication system 300 in which various embodiments may be implemented in accordance with the present disclosure. Communications system 300 may include a plurality of mobile devices, of which mobile devices 302-308 (one or more of which may be example embodiments of user devices 102A and 102B of FIG. 1) are illustrated. Example mobile devices may include a smart phone 302, an identification device, such as an NFC ID band 304, a tablet PC 306, and/or a laptop PC 308. Also shown in communication system 300 is a mobile core network 310, a wireless access point (AP) 312, a cellular base station (BS) 314, a Bluetooth® emitter 316, an NFC terminal 318, a global navigation satellite system (GNSS) network 320, a plurality of GNSS satellites 322a-322n, an internet 330, a location server 340, and a satellite reference network (SRN) 350. One or more of mobile core network 310, wireless AP 312, cellular BS 314, Bluetooth® emitter 316, NFC terminal 318, GNSS network 320, GNSS satellites 322a-322n, internet 330, location server 340, and/or satellite reference network (SRN) 350 can be used to determine the location of one or more of the mobile devices 302-308 and/or for determining the location of at least one user relative to another user. One or more or all of the networks illustrated in FIG. 3 may be an embodiment of network 110 of FIG. 1 or may be additional networks over which the various elements of FIG. 1 may communicate and/or interact.

Wireless AP 312 may include suitable logic, circuitry, interfaces, and/or code that are operable to provide data services to communication devices, such as one or more of the mobile devices 302-308, in adherence with one or more wireless LAN (WLAN) standards such as, for example, IEEE 802.11, 802.11a, 802.11b, 802.11d, 802.11e, 802.11n, 802.11 ac, 802.11v, and/or 802.11u. Wireless AP 312 may communicate with mobile core network 310 and/or internet 330, via one or more links and/or associated devices for example. In this manner, wireless AP 312 may provide network access to mobile devices 302-308.

Cellular BS 314 may include suitable logic, circuitry, interfaces, and/or code that are operable to provide voice and/or data services to communication devices, such as one or more of the mobile devices 302-308, in adherence with one or more cellular communication standards. Exemplary cellular communication standards may include Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). Cellular BS 314 may communicate with mobile core network 310 and/or internet 330, via one or more backhaul links and/or associated devices for example. In this manner, cellular BS 314 may provide network access to mobile devices 302-308, enabling a mobile device, such as smart phone 302, to communicate with one or more databases, services, servers, networks, or interactive media walls as described herein.

Bluetooth® emitter 316 may include suitable logic, circuitry, interfaces, and/or code that are operable to provide Bluetooth® based connectivity to communication devices, such as one or more of mobile devices 302-308, in adherence with various Bluetooth® and/or Bluetooth® Low Energy (BLE) standards. Bluetooth® emitter 316 may communicate with mobile core network 310 and/or internet 330, via one or more backhaul links and/or associated devices for example. In this manner, Bluetooth® emitter 316 may provide network access to mobile devices 302-308, enabling a mobile device, such as smart phone 302 to communicate with one or more entities of system 300.

NFC terminal 318 may include suitable logic, circuitry, interfaces, and/or code that can provide NFC-based connectivity to communication devices, such as one or more of the mobile devices 302-308, in adherence with various short range communication standards such as the Near Field Communications standards. The NFC terminal 318 may communicate with the mobile core network 310 and/or the internet 330, via one or more backhaul links and/or associated devices for example. In this manner, the NFC terminal 318 may provide network access to the mobile devices 302-308. Alternatively, NFC functionality may be resident within each of the mobile devices 302-308.

Mobile core network 310 may include suitable logic, circuitry, interfaces, and/or code that are operable to provide interfacing and/or connectivity servicing between access networks, which may be utilized by the mobile devices 302-308, and external data networks such as packet data networks (PDNs) and/or internet 330. Mobile core network 310 may correspond to one or more service providers that provide, control, and/or manage network accessibility available via mobile devices 302-308. In this regard, mobile devices 302-308 may access the mobile core network 310 via wireless AP 312, cellular BS 314, Bluetooth® emitter 316, and/or NFC terminal 318. Mobile core network 310 may communicate various data services, which are provided by external data networks, to associated user devices such as, for example, mobile devices 302-308. In an example aspect of the disclosure, mobile core network 310 may be operable to communicate with location server 340 to obtain location information that can be used to ascertain the relative locations of mobile devices 302-308.

Each of mobile devices 302-308 may include suitable logic, circuitry, interfaces, and/or code for implementing various aspects of the embodiments disclosed herein. In this regard, each of mobile devices 302-308 may be operable to communicate via a plurality of wired and/or wireless connections. Each of mobile devices 302-308 may be operable, for example, to transmit to and/or receive signals from one or more of wireless AP 312, cellular BS 314, Bluetooth® emitter 316, NFC terminal 318, GNSS network 320, and/or internet 330. Also, each of mobile devices 302-308 may be operable to communicate with, and/or receive services provided by internet 330 and/or mobile core network 310. In this regard, mobile devices 302-308 may be operable to effectuate the presentation of media content on an interactive media wall, which can utilize location server 340.

GNSS network 320 may include suitable logic, circuitry, interfaces, and/or code that may provide navigation information to land-based devices via satellite links. In this regard, GNSS network 320 may include, for example, a plurality of GNSS satellites 322a-322n, each of which is operable to provide satellite transmissions based on a GNSS. Exemplary GNSS systems may include, for example, GPS, GLONASS, Galileo-based satellite system, Beidou and/or Compass systems. Accordingly, GNSS network 320 may be operable to provide positioning information via downlink satellite links transmitted from one or more of the plurality of GNSS satellites 322a-322n to enable land-based devices, such as the mobile devices 302-308, to determine their locations. The plurality of GNSS satellites 322a-322n may directly provide positioning information and/or a land-based device may utilize satellite transmissions from different satellites to determine its location using, for example, triangulation based techniques.

SRN 350 may include suitable logic, circuitry, interfaces, and/or code that are operable to collect and/or distribute data for GNSS satellites on a continuous basis. SRN 350 may include a plurality of GNSS reference tracking stations located around the world to provide A-GNSS coverage all the time in both a home network and/or any visited network. In this regard, SRN 350 may utilize satellite signals received from various GNSS constellations, such as, for example, the plurality of GNSS satellites 322a-322n of GNSS network 320.

Location server 340 may include suitable logic, circuitry, interfaces, and/or code that are operable to provide and/or support location based services. In this regard, location server 340 may be operable to store and/or process location related information pertaining to communication devices in system 300, such as one or more of mobile devices 302-308, as well as the location of other entities, such as points of interest, merchants, etc. It should be noted that location server 340 may access and/or communicate with other location servers/services (not shown) for the purpose of associating a location of communication devices in system 300 with known locations of other entities, points of interest, etc. The location information may be stored in a location reference database 342 in location server 340. Location server 340 may be operable to collect and/or retrieve location information from communication devices. Location server 340 may also be operable to access additional and/or dedicated entities, such as SRN 350 for example, to collect GNSS satellite data, and may be operable to utilize the collected GNSS satellite data to generate GNSS assistance data (A-GNSS data) including, for example, ephemeris data, long term orbit (LTO) data, reference positions and/or time information. Location server 340 may communicate the stored location data when requested to do so.

In operation, location server 340 may be utilized to provide location based services (LBS) in system 300. Location server 340 may maintain, for example, location reference database 342, which may include elements corresponding to each of mobile devices 302-308. Location server 340 may access SRN 350 to collect GNSS satellite data, and may utilize the collected GNSS satellite data to generate GNSS assistance data (A-GNSS data) pertaining to the mobile devices 302-308. Location server 340 may also collect and/or retrieve location information directly from mobile devices 302-308, and/or from other associated entities that interact with mobile devices 302-308 in system 300, such as, for example, wireless AP 312, cellular BS 314, Bluetooth® emitter 316, and/or NFC terminal 318. The retrieved location information may be stored in location reference database 342 in location server 340. Location server 340 may communicate the stored location data, e.g., when requested to do so. Location reference database 342, maintained in location server 340, may be modified, refined, and/or updated using retrieved location information. Location information stored and/or maintained by location server 340 may be utilized to augment and/or substitute for location information received and/or generated based on communication with GNSS network 320, for example, when communication with GNSS network 320 is disturbed.

The location data may also be locally generated, and/or maintained thereafter by devices and/or entities other than location server 340. In this regard, location related data, which typically may be generated and/or maintained by location server 340, may be locally generated, maintained, and/or used by mobile devices 302-308, and/or by service providers thereof. Accordingly, devices and/or entities that typically may be serviced by location server 340, such as mobile devices 302-308, may also perform location related servicing locally. Furthermore, locally generated and/or maintained location related data may be uploaded from mobile devices 302-308, and/or service providers thereof, to location server 340. Uploading the location related data may be performed periodically, on request, and/or based on the configuration of the client devices or entities, and/or location server 340 itself.

The location information stored and/or maintained in location server 340 may be utilized to authenticate, for example, one or more of mobile devices 302-308, users thereof, and/or locations thereof during operations performed by mobile devices 302-308. In this regard, service providers, who may provide access servicing to mobile devices 302-308, may contact location server 340 to request that location server 340 perform authentication procedures, and/or to obtain information necessary for performing the authentication procedures. The service providers may include, for example, cellular, Bluetooth®, WLAN, and/or NFC services providers. For example, a service provider of one of mobile devices 302-308 may request authenticating the mobile device, its user, and location at a given instance. Location server 340 may then perform the necessary authentication procedures, which may be based on existing information in location reference database 342, which is maintained by location server 340. Location server 340 may also perform authentication procedures based on current information, which may be obtained by, for example, communicating with the mobile device, to verify its present location and/or connectivity status or parameters. In this regard, location server 340 may communicate with the mobile device using IP packets that may be communicated via internet 330, which may be transmitted to and/or received by the mobile device via its internet connectivity, and/or via its network access via wireless AP 312, cellular BS 314, Bluetooth® emitter 316, and/or NFC terminal 318.

Internet 330 may include a system of interconnected networks and/or devices that enable exchange of information and/or data among a plurality of nodes, based on one or more networking standards, including, for example, Internet Protocol (IP). Internet 330 may enable, for example, connectivity among a plurality of private and public, academic, business, and/or government nodes and/or networks, wherein the physical connectivity may be provided via the Public Switched Telephone Network (PSTN), utilizing copper wires, fiber-optic cables, wireless interfaces, and/or other standards-based interfaces.

Various devices and/or user identification information may be utilized during network access and/or communications, which may be structured, allocated, and/or assigned based on the specific wired and/or wireless protocols that are used to facilitate any such network access and/or communication. For example, in GSM and/or WCDMA based networks, International Mobile Equipment Identity (IMEI) parameters may be utilized to uniquely identify mobiles devices, and these IMEI parameters may also be used and/or traced back to the mobile devices' users.

FIG. 4 is an operational flow chart illustrating the sharing of media content between proximate users in accordance with various embodiments. At operation 400, a determination regarding whether a first user is proximate to a second user. As described above, this determination can be made based upon information gleaned from location-based services, a discovery protocol through which user devices associated with the first and second users broadcast and/or receive messages or indications of the first and second users' media content application ID, user device IP address, etc. At operation 402, and upon a determination that the first user and the second user are proximate to each other, the first user and the second user are paired. Pairing of the first and second users may entail pairing of their respective media content libraries, pairing of their respective accounts, pairing of their respective user devices, temporary granting of entitlements, etc. It should be noted that operation 402 is optional. For example, as described above, 1-way proximity based entitlement sharing can be provided, where the first or second user may be allowed access to the other user's media content without "pairing" having to occur. At operation 404, at least one of the first and second user is allowed access to one or more instances of media content from a media content library associated with the other of the first and second users.

It should be noted that although various embodiments disclosed herein have been described in the context of users sharing content, users need not be limited to individual users. For example, proximity based entitlement sharing can be utilized in an enterprise-to-enterprise context, an enterprise-to-user context and vice-versa. Moreover, instances of media content versions, which in the context of movies can be, for example, 4K/720p/1080p resolutions, director's cut, service provider exclusive cut, etc. can be mixed and matched. That is, authorizations and/or usage rules can be de-coupled from any particular manifestation of the media content temporarily.

In accordance with another embodiment, proximity can be leveraged to determine the most popular media content that a nearby user or group of users is consuming or has consumed. FIG. 5 illustrates an example process that may be performed in accordance with this embodiment. At operation 500, a system and method may determine the most popular media content associated with a second user or group of users that is within a proximity of a first user. Proximity can be based on some predetermined distance, a geographic region, some predefined area or common location, etc., such as a zip code, a venue, or building, or an event such as a ball game.

For example, the first user can be informed of the second user's most consumed media content, such as the second user's favorite (or top 3, top 5, or top 10) songs, albums, TV shows, movies, games, etc. that the second user has digital rights to or is entitled to consume. Likewise, the second user can be informed of the first user's most consumed media content. It should be noted that the manner in which the most popular media content is determined can vary, as described in greater detail below, and either user can opt in or out of having his or her media content (or information related to his or her media content) publicized or available for others to see.

At operation 502, at least one of (1) information regarding the most popular media content of the second user (or group) and (2) a transaction opportunity regarding the most popular media content of the second user (or group) may be provided to the first user. That is, and in accordance with this embodiment, providing the first user with access to one or more media contents (as described with respect to FIG. 4) can entail providing the first user with details relevant to the most popular media content, such as the artist of a song or leading actors in a movie, related media content. Additionally, a direct link to a transactional portal that allows the first user to purchase, rent, or otherwise obtain the right/entitlement to consume that most popular media content from the second user (or an account to access content associated with the second user) may be provided. Yet another example can involve providing a recently-viewed activity feed of the second user or group with a visual representation of content consumed to the first user, where the first user to whom this information is provided can be allowed to transact for the media content directly without a need to separately connect to a transactional service at the time of the transaction.

Regarding transactions, a transaction portal can be provided through which users can directly purchase or rent media content discovered via proximity based entitlement sharing or surfacing without the need for users to leave the application, media player, etc. Transactions can be pre-authorized, or authorization can be provided via a GUI (described in greater detail below and illustrated in FIG. 6).

Although the embodiment described above is presented in the context of two users, it should be understood that other embodiments contemplate larger numbers of users. In fact, for certain applications, the more users that are present in a particular geographical region and deemed to be proximate to each other, the more data can be analyzed to provide useful information. For example, certain embodiments can be implemented in a large event/venue context, where a determination can be made that all users located in a concert venue at the same time are proximate to each other, and data regarding each user's most popular media content can be gathered. Such information can be used to determine, for example, that a particular song is the most popular song amongst a group of concert-goers. This information may then be leveraged by the concert venue and/or a performing artist to create a set list or play music that is targeted to the group of concert-goers. Another context may be a school setting, wherein each student that passes through an entrance or hallway is polled to determine each student's most popular media content. Each of the students may then be informed about this most popular media content.

As described above, determining the most popular media content can be performed in a variety of ways. Aggregation techniques or algorithms can be used to determine how often media content is consumed. Additionally, digital media players, for example, enable users to rate or rank their media. Such information can be gleaned as well to determine a most popular media content. Further still, determining the most popular media content can be based on the most popular media content per day, month, of all-time, etc. The most popular media content may be the most popular media content across all types of media content, across only a particular type of media content, across a genre, etc. Moreover, the most popular content need not be limited to a singular media content, but may be, e.g., the top three songs that are listened or the top five movies that have been watched over the last month. Further still, the most popular content may be the most transacted media content.

In a group setting, simple aggregation can be utilized to determine how many users consume a particular media content, and the most consumed media content can be deemed as being the most popular. However, more sophisticated aggregation techniques may be utilized, where the aggregated data can be weighted. For example, determining the popularity of media content can involve not only simple aggregation, but can also involve determining the number of times a particular song appears in a playlist, the frequency of access for a particular group, region, age, gender, or any other relevant metric, etc. That is, weighting can be performed with contextual identifiers. Although some examples of aggregation, weighting, and determining popularity are presented herein, other techniques or algorithms may be used in accordance with other embodiments.

Figure 6:
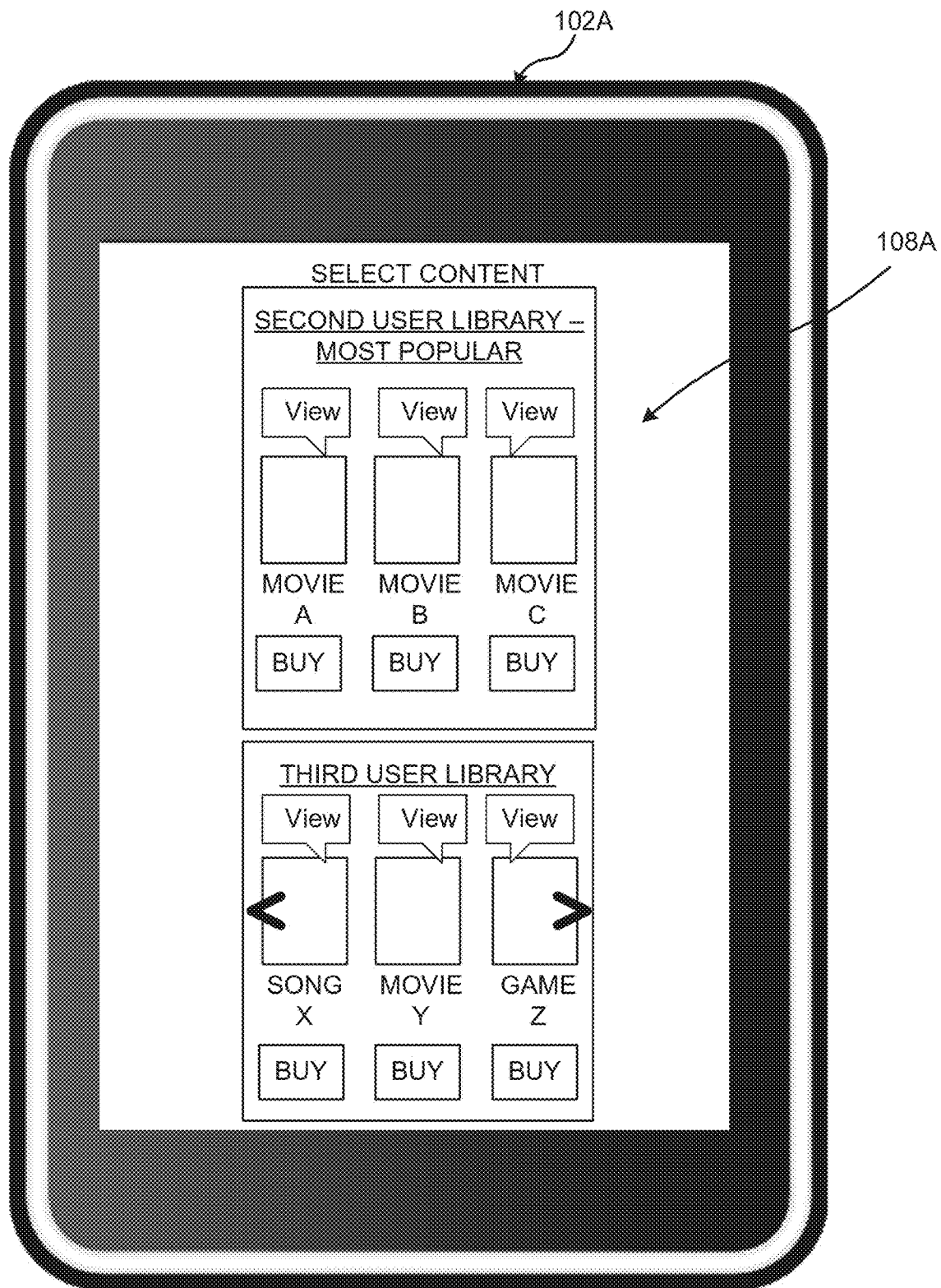
FIG. 6 illustrates an example GUI used for interacting with popular media content in accordance with various embodiments.

FIG. 6 illustrates an example GUI that may be presented to users in accordance with various embodiments. FIG. 6 illustrates first user device 102A, which in this example may be a smart phone. Display 108A may present the GUI within a dedicated proximity based entitlement application, existing media application, dedicated media player, etc. The GUI can present a proximate second user's most popular content. Options can be provided to view information, view visual representations, consume clips, as well as engage in transactions for that most popular content. Moreover, the GUI can present an option to view other proximate users' libraries (e.g., a third user's library) as described in previous embodiments, where the other proximate users' libraries may be identified and displayed by virtue of users' having similar tastes or media content in their respective libraries that is similar, but not present. Accordingly, new media content can be presented to users, and opportunities for content discovery can be leveraged.

Accordingly, a "searcher" user, through surfacing of random or previously unknown (to the user) content, the likes of proximate users can be identified, content of users with similar likes can be discovered, or trends can be determined or identified. From a "searchee" user perspective, transactions (that other users engage in based on or identified due to the searchee user's most popular media content being surfaced) can be used to generate credits or points for obtaining additional media content, increasing a social media ranking or score, or receiving some percentage of revenue from each transaction attributed to the searchee user. Such searchee users can be leveraged as targeted marketing opportunities. It should be noted that although certain embodiments require proximity to be enabled, other embodiments need not rely on proximity. For example, celebrity-based surfacing is contemplated whereby matches between users' tastes or similar media content with those of a celebrity's can be used as a content discovery tool.

Figure 7:
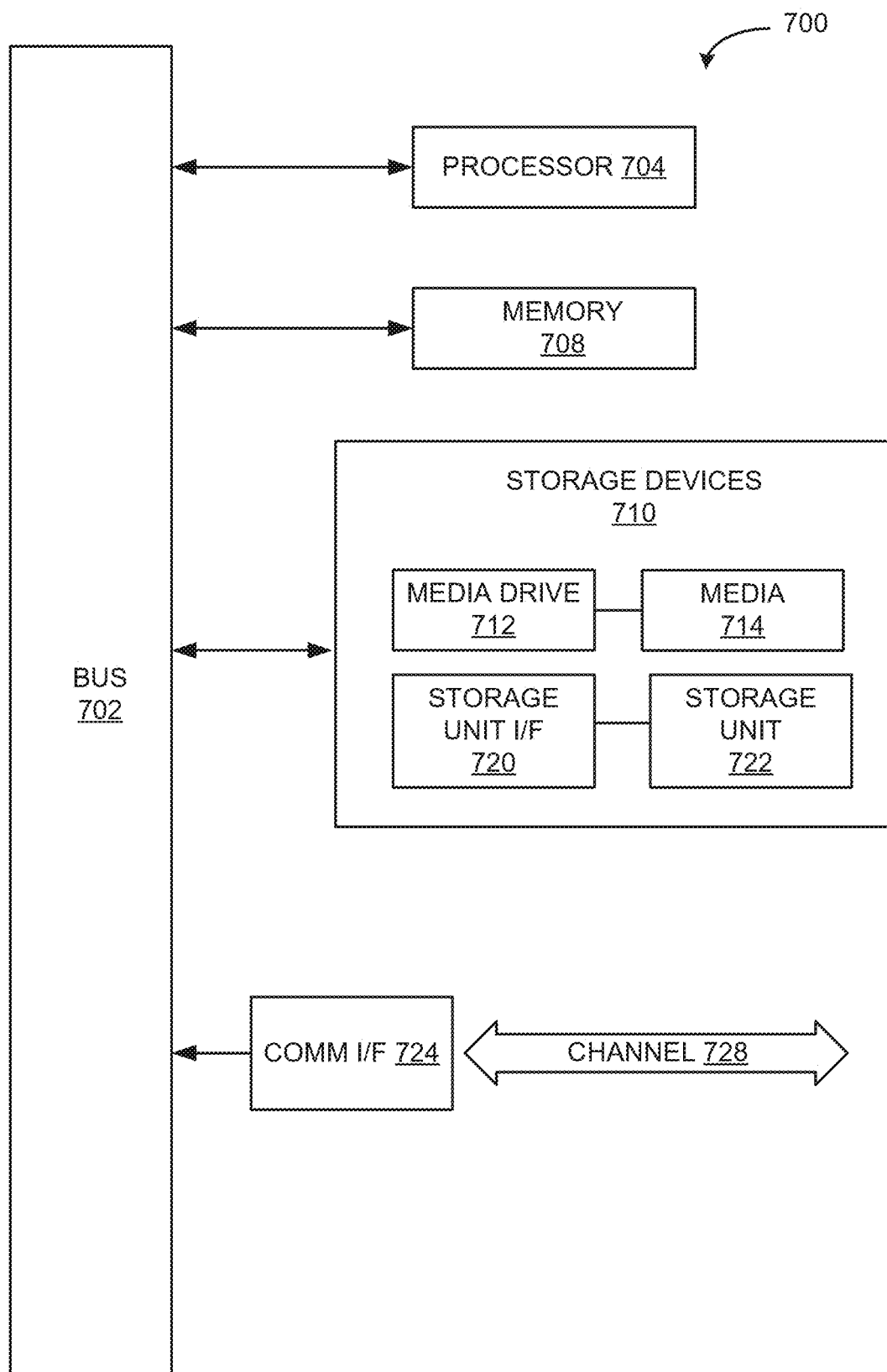
FIG. 7 is an example computing module that may be used to implement various features of embodiments described in the present disclosure.

FIG. 7 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example navigation systems, portable computing devices, and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 714 might include, for example, a hard disk, an integrated circuit assembly, magnetic tape, cartridge, optical disk, a CD or DVD, or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   determining that a first device of a first user is proximate to a second device of a second user, based on a second device signal broadcast from the second device, wherein one or more first media contents in a first media content library are associated with the first user;

in response to determining that the first device is proximate to the second device, triggering media content sharing to allow the first user to access one or more second media contents from a second media content library associated with the second user;

determining that the first device is proximate to a third device of a third user, based on a third device signal broadcast from the third device;

in response to determining that the first device is proximate to the third device, triggering another media content sharing to allow the first user to access one or more third media contents from a third media content library associated with the third user;

in response to determining that the first device is proximate to both the second device and the third device, determining a most popular media content among the one or more second media contents and the one or more third media contents; and presenting the most popular media content on a display of the first device.

2. The computer-implemented method of claim 1, further comprising pairing the first device and the second device upon determining that the first device is proximate to the second device.

3. The computer-implemented method of claim 2, wherein pairing the first device and the second device occurs at one of a user account level, a media service application level, or a user device level.

4. The computer-implemented method of claim 2, wherein pairing the first device and the second device comprises a temporary grant or exchange of one or more entitlements associated with the one or more first media contents or the one or more second media contents.

5. The computer-implemented method of claim 2, wherein pairing the first device and the second device is performed using a server without the first device and the second device exchanging account information.

6. The computer-implemented method of claim 1, further comprising:

presenting the one or more second media contents on the display of the first device of the first user; and streaming one of the most popular media content or the one or more second media contents to the first device, based on a selection by the first user.

7. The computer-implemented method of claim 6, further comprising:

upon determining that the first device is no longer proximate to the second device, stopping the presenting of the one or more second media contents, and if the one or more second media contents is being streamed to the first device, continuing the streaming of the one or more second media contents until a conclusion of the one or more second media contents.

8. The computer-implemented method of claim 6, further comprising:

upon determining that the first device is no longer proximate to the second device, presenting an ad-supported version of the one or more second media shared access to the one or more media contents.

9. The computer-implemented method of claim 1, wherein determining the most popular media content comprises determining a number of times the most popular media content has been consumed by both the second user and the third user.

10. The computer-implemented method of claim 1, wherein determining the most popular media content comprises determining a number of transactions involving the most popular media content by both the second user and the third user.

11. The computer-implemented method of claim 1, wherein the most popular media content is determined within a defined region and a time period.

12. The computer-implemented method of claim 1, further comprising applying at least one contextual identifier to characterize the one or more second media contents and the one or more third media contents in order to determine the most popular media content.

13. The computer-implemented method of claim 1, further comprising presenting an option to engage in a transaction regarding the one or more second media contents, the one or more third media contents, or the most popular media content.

14. The computer-implemented method of claim 1, further comprising presenting information associated with the one or second more media contents, the one or more third media contents, or the most popular media content.

15. The computer-implemented method of claim 1, further comprising determining whether the first user and the second user have similar media contents in the first media content library and the second media content library, respectively, wherein accessing the one or more second media contents by the first user is contingent upon the first user and the second user having the similar media contents.

16. The computer-implemented method of claim 15, further comprising presenting at least one of information associated with the similar media contents or an option to engage in a transaction for the similar media contents, the similar media contents of the first user being absent from the second media content library associated with the second user, and the similar media contents of the second user being absent from the first media content library of the first user.

17. The computer-implemented method of claim 1, further comprising:

streaming the most popular media content to the first device, based on the first user selecting the presented most popular media content.

18. A content provider server comprising:

a memory storing a first media content library of a first user having one or more first media contents, a second media content library of a second user having one or more second media contents, and a third media content library of a third user having one or more third media contents;

a processor configured to:

determine that a first device of the first user is proximate to a second device of the second user, based on a second device signal broadcast from the second device;

in response to determining that the first device is proximate to the second device, trigger media content sharing to allow the first user to access the one or more second media contents from the second media content library associated with the second user;

determine that the first device is proximate to a third device of the third user, based on a third device signal broadcast from the third device;

in response to determining that the first device is proximate to the third device, trigger another media content sharing to allow the first user to access the one or more third media contents from the third media content library associated with the third user;

in response to determining that the first device is proximate to both the second device and the third device, determine a most popular media content among the one or more second media contents and the one or more third media contents; and present the most popular media content on a display of the first device.

19. The content provider server of claim 18, wherein the processor is further configured to pair the first device and the second device upon determining that the first device is proximate to the second device.

20. The content provider server of claim 19, wherein pairing the first device and the second device is performed without the first device and the second device exchanging account information.

21. The content provider server of claim 18, wherein the processor is further configured to present the one or more second media contents on the display of the first device of the first user; and stream one of the most popular media content or the one or more second media contents to the first device, based on a selection by the first user.

22. The content provider server of claim 21, wherein the processor is further configured to:

upon determining that the first device is no longer proximate to the second device, stop the presenting of the one or more second media contents, and if the one or more second media contents is being streamed to the first device, continue streaming the one or more second media contents until a conclusion of the one or more second media contents.

23. The content provider server of claim 22, wherein the processor is further configured to:

upon determining that the first device is no longer proximate to the second device, present an ad-supported version of the one or more second media contents.

24. The content provider server of claim 18, wherein determining the most popular media content comprises determining a number of times the most popular media content has been consumed by both the second user and the third user.

25. The content provider server of claim 18, wherein the processor is further configured to:

stream the most popular media content to the first device, based on the first user selecting the presented most popular media content.

\* \* \* \* \*